United States Patent Office 2,831,004
Patented Apr. 15, 1958

2,831,004
ISOLATION OF TELOMER ACIDS

William S. Barnhart, Cranford, and Robert H. Wade, West Paterson, N. J., assignors, by mesne assignments, to Minnesota Mining and Manufacturing Company, St. Paul, Minn., a corporation of Delaware No Drawing. Application March 15, 1956
Serial No. 571,588

10 Claims. (Cl. 260—408)

This invention relates to the isolation of telomer acids and more particularly to the isolation of telomer acids, produced by the hydrolysis of perchlorofluoroalkanes, from crude hydrolysis mixtures or products.

In copending application Serial No. 541,212, filed October 18, 1955, there is disclosed a process and plant design for the preparation of certain telomer acids which are produced by the hydrolysis of the telomerization product of chlorotrifluoroethylene with sulfuryl chloride. In this process, a telomer is hydrolyzed with oleum and the hydrolysis product is transferred from a reaction zone to a drowning tank in which it is cooled and diluted with water to effect the separation of a product layer and a sulfuric acid layer. The cooling and dilution of the reaction mixture is conveniently effected by the addition of ice thereto, with or without additional water, if desired.

The present invention relates to the specific method whereby the formation of two phases in the reaction mixture by the dilution thereof is effected. Prior to the present invention, the crude hydrolysis product was subjected to a prolonged extraction using an organic solvent, after which the organic phase or extract was washed with water, concentrated and distilled, and accordingly, this method involved the handling of large volumes of solution and was time consuming.

In accordance with the present invention, however, a simple, rapid and economical method of telomer acid isolation is provided since telomer acids, such as those disclosed in the aforementioned copending application, are insoluble in sulfuric acid having a concentration of about 30 to 70 percent by weight; hence, when a crude hydrolysis product is diluted with a sufficient quantity of ice, or a mixture of ice and water, to lower the sulfuric acid concentration to a value within the range aforementioned, the formation of two phases results with the telomer acid separating as a lower phase and an aqueous sulfuric acid phase being the upper phase. It has been found that the optimum concentration of sulfuric acid for the separation of the two phases is about 50 percent by weight.

A crude telomer hydrolysis product may have the following weight distribution:

100% $H_2SO_4$—between 100 and 135 lbs. or 125 lbs.
Telomer—between 10 and 25 lbs. or 15 lbs.
Telomer acid—between 90 and 120 lbs. or 100 lbs.
$ClSO_3H$—between 15 and 35 lbs. or 25 lbs.
$FSO_3H$—between 10 and 30 lbs. or 20 lbs.
HCl—between 1 and 15 lbs. or 8 lbs.
HF—between 0.5 and 2 lbs. or 1 lb.

The above mixture is obtained as a single phase when a telomer having less than 8 carbon atoms is hydrolyzed, but when higher molecular weight telomers, i. e., those having more than 8 carbon atoms, are hydrolyzed a two phase mixture is formed. The telomer acid product is distributed between the two phases, however, and, therefore, the two phases are treated as one. To this crude hydrolysis product is added between about 0.3 to 1 and about 20 to 1, preferably between about 0.5 to 1 and 2 to 1, volumes of ice to volume of product, and an equivalent volume is usually employed. The hydrolysis product then separates into two phases from which telomer acids can be removed conveniently. The upper aqueous sulfuric acid layer contains, in addition, HCl, HF and traces of telomer acid product. The traces of telomer acid may be removed from the upper phase by extraction with about 0.05 to 1, preferably 0.1 to 0.3, volume of solvent per volume of aqueous acid phase, suitable solvents being benzene, xylene, toluene, 1,1,2-trichlorotrifluoroethane, cyclohexane, carbon tetrachloride, or chlorobenzene, and the like.

The traces of telomer acid removed from the upper phase may then be added to the lower phase, or bottom layer, which contains unreacted telomer, telomer acid product, some sulfuric acid, and traces of HCl, HF, and water. The bottom layer or lower phase, is then subjected to washing with aqueous $H_2SO_4$ or HCl to remove water soluble materials such as $H_2SO_4$ and HF and also to maintain the telomer acid product in the organic phase of the two phases which are thus formed from the bottom layer. Water is then removed from the bottom layer by azeotropic distillation using toluene or benzene as an azeotroping agent. The telomer acid product is then recovered by vacuum distillation.

In addition to the isolation of the acids disclosed in the aforementioned copending application, the present invention is also applicable to the isolation of other telomer acids which are formed by hydrolysis, certain of these acids being disclosed in copending applications Serial Nos. 463,073, filed October 18, 1954, and 493,554, filed March 10, 1955.

The invention will be further illustrated by reference to the following specific examples:

Example 1

A number of solubility tests were made to determine the solubility of various telomer acids in 50 weight percent sulfuric acid. The telomer acids tested were those prepared by the telomerization of chlorotrifluoroethylene using sulfuryl chloride as a telogen.

In the tests, 50 weight percent sulfuric acid was saturated with selected telomer acids and analyzed as shown below:

| Telomer Acid | Mg. acid/ ml. solution | Weight percent Soluble* |
|---|---|---|
| $C_6$ mono | 0.27 | 0.019 |
| $C_8$ mono | 0.08 | 0.006 |
| $C_{10}$ mono | 0.28 | 0.020 |
| $C_8$ diacid | 0.06 | 0.005 |

*Density of 50% $H_2SO_4$ is 1.395 g./ml.

Example 2

Telomer tetramer, having the formula $Cl(CF_2CFCl)_4Cl$ (5 gram moles), was hydrolyzed with 2,450 grams of 5 percent oleum for a period of 27 hours at a temperature of 225° C. The 2.5 liters of crude hydrolysis mixture (4386 grams) was slowly added to an equal volume of crushed ice, with stirring and external cooling being used for the final addition. After decanting the aqueous sulfuric acid layer, the crude telomer acid product was washed with 1 liter of water and separated; the crude acid weighed 2400 grams.

Distillation data are given below:

| Fraction | B. P., °C. | Moles | Percent Conversion | Percent Yield |
| --- | --- | --- | --- | --- |
| Cl(CF$_2$—CFCl)$_4$Cl | 90–110/3 mm | 0.45 | | |
| Cl(CF$_2$—CFCl)$_2$ CF$_2$COOH | 125–130/3 mm | 3.05 | 61 | 67 |
| HOOC(CF$_2$-CFCl)$_3$ COOH | 160–170/3 mm | 0.95 | 19 | 21 |

The aqueous layer analyzed 60 weight percent sulfuric acid ($d_4^{20}$=1.70) and contained a total of 1.0 gram of telomer acid by analysis.[1]

It will be obvious to those skilled in the art that many modifications may be made within the scope of the present invention without departing from the spirit thereof, and the invention includes all such modifications.

We claim:

1. A method for the isolation of perchlorofluorocarboxylic acids from a crude perchlorofluoroalkane hydrolysis product containing sulfuric acid which comprises diluting the hydrolysis product to a concentration of about 30 to 70 percent by weight of sulfuric acid whereby an upper phase containing sulfuric acid and a lower phase containing said perchlorofluorocarboxylic acids are formed, and separating the phases.

2. A method according to claim 1 in which the crude hydrolysis mixture is diluted by the addition of ice.

3. A method for the isolation of a compound, having the formula

Cl(CF$_2$—CFCl)$_{n-1}$CF$_2$COOH in which $n$ is an integer from 2 to 16, from a crude perchlorofluoroalkane hydrolysis product containing sulfuric acid which comprises diluting the hydrolysis product to a concentration of about 30 to 70 percent by weight of sulfuric acid whereby an upper phase containing sulfuric acid and a lower phase containing said compound having the formula: Cl(CF$_2$—CFCl)$_{n-1}$CF$_2$COOH are formed, and separating the phases.

4. A method according to claim 3 in which the crude hydrolysis mixture is diluted by the addition of ice.

5. A method for the isolation of a compound, having the formula

Z(CF$_2$—CFCl)$_{n-1}$CF$_2$COOH in which Z is selected from the group consisting of carboxyl and perhalomethyl radicals having a total atomic weight not in excess of 146.5 and $n$ is an integer from 2

[1] s-Benzylthiuronium chloride precipitation of acids.

to 16, from a crude perchlorofluoroalkane hydrolysis product containing sulfuric acid which comprises diluting the hydrolysis product to a concentration of about 30 to 70 percent by weight of sulfuric acid whereby an upper phase containing sulfuric acid and a lower phase containing said compound having the formula:

Z(CF$_2$—CFCl)$_{n-1}$CF$_2$COOH are formed, and separating the phases.

6. A method according to claim 5 in which the crude hydrolysis mixture is diluted by the addition of ice.

7. A method for the isolation of a compound, having the formula

Z—CFCl(CF$_2$—CFCl)$_{n-2}$CF$_2$—COOH in which Z is selected from the group consisting of carboxyl and perhalomethyl radicals having a total atomic weight not in excess of 146.5 and $n$ is an integer from 2 to 16, from a crude perchlorofluoroalkane hydrolysis product containing sulfuric acid which comprises diluting the hydrolysis product to a concentration of about 30 to 70 percent by weight of sulfuric acid whereby upper phase containing sulfuric acid and a lower phase containing said compound having the formula:

Z—CFCl(CF$_2$—CFCl)$_{n-2}$CF$_2$—COOH are formed, and separating the phases.

8. A method according to claim 7 in which the crude hydrolysis mixture is diluted by the addition of ice.

9. A method for the isolation of perchlorofluorocarboxylic acids, having from 4 to about 20 carbon atoms, from a perchlorofluoroalkane hydrolysis product containing sulfuric acid which comprises diluting the hydrolysis product to a concentration of about 30 to 70 percent by weight of sulfuric acid whereby an upper phase containing sulfuric acid and a lower phase containing said perchlorofluorocarboxylic acids are formed, and separating the phases.

10. A method according to claim 9 in which the hydrolysis product is diluted by the addition of ice.

No references cited.